Sept. 25, 1923.
C. E. HUGHES
1,468,784
LIGHT DEFLECTING HEADLIGHT
Filed May 25, 1922
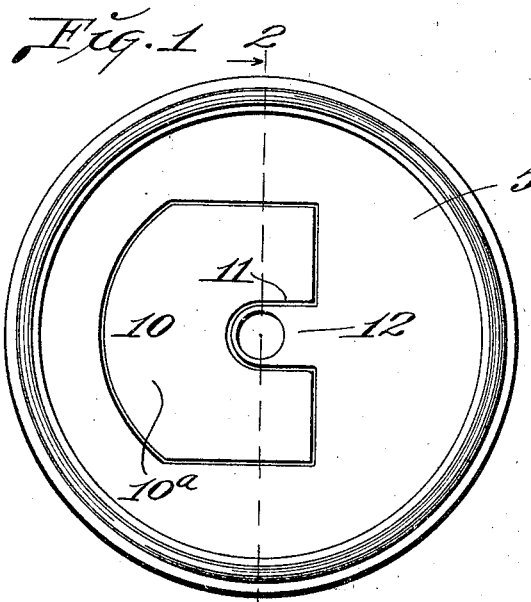
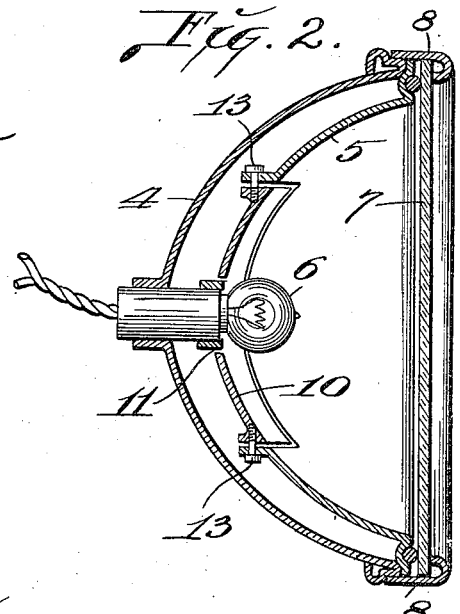
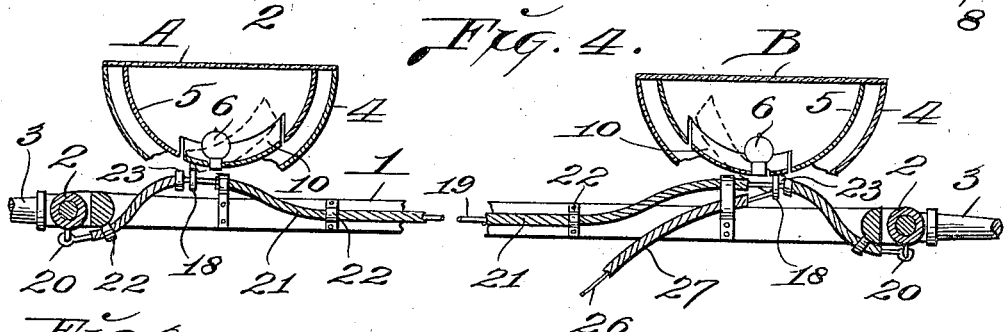
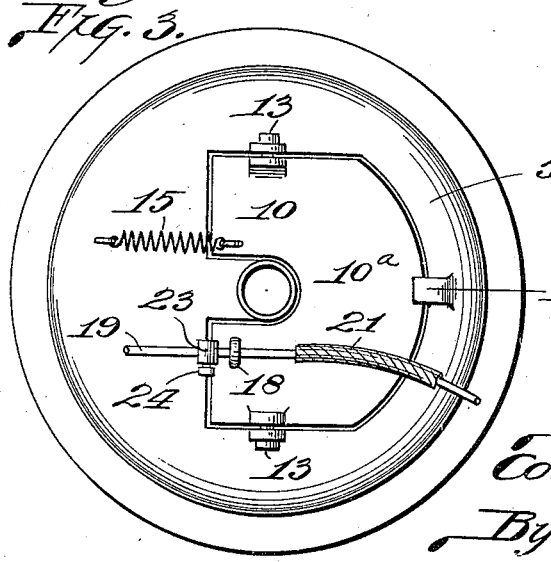
INVENTOR,
Cora E. Hughes.
By R. W. Brunt Atty.

Patented Sept. 25, 1923.

1,468,784

UNITED STATES PATENT OFFICE.

CORA ELIZABETH HUGHES, OF LOS ANGELES, CALIFORNIA, ASSIGNOR OF ONE-THIRD TO THOMAS M. INGMAN AND ONE-THIRD TO LLOYD L. ELLIOTT, BOTH OF LOS ANGELES, CALIFORNIA.

LIGHT-DEFLECTING HEADLIGHT.

Application filed May 25, 1922. Serial No. 563,643.

*To all whom it may concern:*

Be it known that I, CORA ELIZABETH HUGHES, a citizen of the United States, residing at Los Angeles, in the county of Los Angeles and State of California, have invented new and useful Improvements in Light-Deflecting Headlights, of which the following is a specification.

This invention relates to the deflection of the rays of light from headlights and the like, and is particularly adaptable for use in connection with headlights for motor vehicles.

It is the object of the invention to provide for lateral deflection of the light in order to properly illuminate the road when turning the vehicle and to also afford additional illumination of the side of the road when driving in fog or rain.

The invention contemplates the provision of manually controlled means for causing the desired additional illumination at the side of the road and is also adapted for an automatic control of the deflecting means whereby a portion of the light will be laterally deflected in the direction of turning when the steering mechanism is actuated.

More specifically the invention provides a movable light reflecting means conforming to the contour of the reflector of the headlight, and normally lying in an opening in said reflector so as to continue the conformation thereof; said movable reflector being adapted to be swung upon a vertical axis so as to laterally deflect a portion of the rays of light from the headlight.

The invention will be readily understood from the following description of the accompanying drawings, in which:

Figure 1 is a front elevation of a headlight constructed in accordance with the invention;

Figure 2 is a vertical section on the line 2—2 of Figure 1;

Figure 3 is a rear elevation of the headlight; and

Figure 4 is a plan view showing a pair of head lights, constructed in accordance with the invention, and the operating connection for the same.

The improved headlights are mounted in usual manner at the respective sides of a motor vehicle, and are shown at A and B as the left hand and right hand lights, respectively. The front axle of the vehicle is shown at 1 and is provided with usual steering knuckles 2 rotatable upon vertical axes and carrying the usual stub shafts 3 upon which the wheels are mounted.

Each of the headlights consists of a usual casing 4 and a usual reflector 5 and a source of light comprising a usual electric lamp 6. A glass 7 is mounted at the front of the headlight and is held in place by the usual retaining ring 8.

In the form of the invention illustrated, the means for laterally deflecting a portion of the rays of light from the headlight consists of a reflector in rear of the source of light, comprising a portion cut out from the main reflector 5. This cut out portion of the reflector forms a movable reflecting means, and is shown at 10 as extending around the lamp 6 and having a notch 11 in one side thereof, so that the corresponding projecting tongue 12 of the main reflector may support the lamp in usual position.

The movable reflector extends laterally from the lamp 6 to a greater distance at one side than at the other, as shown at $10^a$, and the two headlights of the vehicle are so arranged that the portions $10^a$ of the movable reflectors will extend toward one another.

The movable reflector is pivotally mounted with relation to the main reflector 5 as shown at 13, and this pivotal mounting for the movable reflector adapts the latter for pivotal movement upon a vertical axis. This axis is preferably arranged in line with the center of the lamp 6 in order that when the movable reflector is swung upon its pivot the focus of the rays of light reflected thereby will remain unchanged.

The movable reflector is normally held in a position continuing the configuration of the main reflector. A spring 15 connected at its respective ends to the movable reflector and to the main reflector and preferably positioned at the rear of the latter, is adapted to yieldably urge the movable reflector into its normal position. A stop, shown at 16, is mounted upon the rear of the main reflector in the path of the edge of the movable reflector so as to prevent swinging movement of the latter rearwardly beyond its normal position.

The movable reflector is adapted to be swung upon its pivot to the position shown in dotted lines in Figure 4 so that the extension 10ª of the movable reflector is angularly and forwardly disposed with relation to reflector 5. As a result, reflector 10 will angularly reflect a portion of the rays of light from the headlight so as to laterally deflect said rays beyond the side of the vehicle. The means for shifting the movable reflectors of the headlights is preferably controlled by the steering mechanism, and is arranged so that a turning movement to the right will shift the movable reflector of the right hand headlight in order to throw light beyond the right hand side of the car, while a turning movement to the left will similarly actuate the movable reflector of the left hand headlight in order to deflect a portion of the light rays from the left hand headlight laterally beyond the left hand side of the car.

As an instance of this arrangement, eyes 18 are positioned on the rear surfaces of the movable reflectors. These eyes are at the side of the axes of the movable reflectors opposite the extensions 10ª of said reflectors, and a flexible cable 19 extends transversely of the car and through said eyes, with the ends of the cable attached to the respective steering knuckles 2, as shown at 20. The flexible cable may be encased within a suitable flexible sheathing 21, said sheathing being preferably supported by a clamping member 22 which may be attached to the axle 1. Abutment collars 23 are fixed upon the flexible cable beyond the respective eyes 18, said collar being preferably adjustably positioned by means of set screws 24.

By this arrangement it will be seen that turning movement of the steering knuckles in steering the car will shift the flexible cable in one direction or the other and thereby cause one or the other of the collars 23 to abut against the adjacent eye 18 in order to swing the movable reflector upon its pivot. The collars are so positioned relative to eyes 18 as to provide only for the swinging of the movable reflector of headlight A when the steering mechanism is actuated for a turn to the left, while movement of the steering means for a turn to the right will only shift the movable reflector of headlight B. As a result, when a turn to the right is made, a portion of the rays of light from the right hand headlight will be deflected laterally beyond the car in order to illuminate the road in the direction of turn, while the remaining rays of light from the right hand headlight as well as all of the rays of light from the left hand headlight will be projected in the usual manner. The reverse action will occur when a left hand turn is made in order to illuminate a left hand turn in the road by means of the deflected rays from the left hand headlight, while the remaining rays from the left hand headlight and all of the rays from the right hand headlight will be projected in the usual manner. As soon as the turning movement has been completed it will be understood that the movable reflector which has been shifted will be returned to its normal position by means of its spring 15.

The invention preferably also provides for continually illuminating the side of the road irrespective of operation of the steering mechanism, as will be found desirable when driving in fog or the like. For this purpose a flexible cable 26 received within a flexible sheathing 27 may be connected to the back of the movable reflector of the right hand headlight at the side of the axis of the movable reflector opposite its extension 10ª. This cable may lead to a suitable point convenient to the driver of the car, preferably the steering wheel, so that a pull upon the cable will swing the movable reflector in order to laterally deflect a portion of the rays of light from the headlight, thereby illuminating the side of the road. The movable reflector may be held in this shifted position by any suitable locking means (not shown) for the cable 26 arranged convenient to the driver.

It will thus be seen that I have provided a headlight construction wherein a portion of the rays of light may be laterally deflected in order to properly illuminate the road when turning the vehicle. The operating connection for the deflecting means provides an automatic control of the latter dependent upon the movement of the steering mechanism, and the manual control for the right hand headlight also affords means whereby the side of the road may be constantly illuminated by the laterally deflected rays of light.

While I have illustrated and described but one practical embodiment of the construction, it will be apparent that various changes may be made in the combination and arrangement of parts without departing from the spirit of the invention.

What is claimed is:

1. A headlight having a fixed reflector, a source of light supported by said fixed reflector, said fixed reflector having an opening therein extending in one direction beyond said source of light, a movable reflector pivoted in said opening upon an axis extending through said source of light, and means for turning said movable reflector in said opening to deflect a portion of the rays of light from said headlight.

2. A headlight having a reflector, a source of light supported by said reflector, said reflector having an opening therein, a movable reflector pivoted vertically in said opening and elongated in one direction beyond its axis to a substnatially greater extent than in the opposite direction beyond its axis, and an operating connection at the rear of said movable reflector at the side of its axis opposite the elongated portion thereof, for turning said movable reflector to deflect a portion of the rays of light from said headlight.

3. The combination with a vehicle of headlights at the respective sides of the vehicle and each having a fixed reflector and a movable reflector pivoted upon a vertical axis at the rear of said fixed reflector, said movable reflectors forming lateral extensions at one side of their axes and extending toward one another, abutment elements upon the rear of said movable reflectors at the opposite side of their axes, an actuating member shiftable responsive to steering movement of the vehicle, and means upon said member for engaging the respective abutment elements upon steering movement in opposite directions.

4. The combination with a vehicle, of headlights at the respective sides of the vehicle and each having a movable reflector pivoted upon a vertical axis, said reflectors forming lateral extensions at one side of their axes and extending toward one another, and an actuating member controlled by steering movement of the vehicle and adapted to turn the respective reflectors upon steering movement in opposite directions.

In testimony whereof I have signed my name to this specification.

CORA ELIZABETH HUGHES.